United States Patent
Jimenez et al.

[11] Patent Number: 5,143,470
[45] Date of Patent: Sep. 1, 1992

[54] DEVICE FOR PIVOTABLE LINKAGE BETWEEN TWO LEVERS

[75] Inventors: Antonio Jimenez, Meyrin, Switzerland; Patrice Deplante, Annemasse, France

[73] Assignee: Mefina S.A., Switzerland

[21] Appl. No.: 798,926

[22] Filed: Nov. 29, 1991

[30] Foreign Application Priority Data

Nov. 29, 1990 [CH] Switzerland ............ 3779/90

[51] Int. Cl.⁵ ............................................. F16C 11/00
[52] U.S. Cl. .................................. 403/149; 403/145; 403/151
[58] Field of Search ............ 403/145, 149, 157, 151, 403/120, 61, 79; 112/323

[56] References Cited

U.S. PATENT DOCUMENTS

| | | | |
|---|---|---|---|
| 458,228 | 8/1891 | Elliott | 403/145 |
| 915,524 | 3/1909 | Wise | 403/157 |
| 2,372,120 | 3/1945 | Roberson | 403/151 X |
| 2,834,277 | 5/1958 | Tanke | 403/145 X |
| 3,036,536 | 5/1962 | Ritter | 112/237 |
| 4,170,804 | 10/1979 | Scotcher | 403/157 X |
| 4,541,354 | 9/1985 | Takenoya et al. | 112/314 |

FOREIGN PATENT DOCUMENTS

| | | |
|---|---|---|
| 0374090 | 6/1990 | European Pat. Off. . |
| 177846 | 12/1905 | Fed. Rep. of Germany . |
| 1425957 | 3/1969 | Fed. Rep. of Germany . |
| 7411070 | 3/1974 | Fed. Rep. of Germany . |
| 3500336 | 7/1986 | Fed. Rep. of Germany . |
| 8613993 | 10/1986 | Fed. Rep. of Germany . |
| 3628115 | 2/1988 | Fed. Rep. of Germany . |
| 1591200 | 6/1981 | United Kingdom . |

Primary Examiner—Andrew V. Kundrat
Attorney, Agent, or Firm—Cushman, Darby & Cushman

[57] ABSTRACT

The end of the lever (2b) ends in a fork that receives the lever (5b) between its tines (6a, 6b). Each time (6a, 6b) has a recess (9) made on its inner face. This recess (9) is parallel to this inner face and extends longitudinally of this tine, thus opening out at its end to make a passage for receiving a pivot (10). This open space (9) does not extend through the full thickness of the tines (6a, 6b), thus preserving axial stop faces for retaining the pivot (10). The end of the lever (5b) has a lateral recess (11) intended to engage the pivot (10). A draw spring (13) has one end solid with the lever (2b), while the other is caught in a groove (12) that is concentric with the axis of the pivot (10) and is made at the end of the lever (5b) opposite the side face in which the recess (11) opens.

6 Claims, 2 Drawing Sheets

DEVICE FOR PIVOTABLE LINKAGE BETWEEN TWO LEVERS

The present invention relates to a device for pivotable linkage between two levers, in which one end of a first lever has a fork that between its tines receives one end of a second lever.

When two levers are pivotably linked to one another without rolling on balls, it is very difficult at the same time to have free movement between them without there being any play at all. This is true particularly for levers that operate at high frequencies, such as the levers in a drive mechanism for feeding material to be sewn in a sewing machine. In such a mechanism, operating in alternating motion at high frequency, the play between the pivotably linked levers produces noise, and for the same reason it causes imprecision in the sewing.

In such a mechanism, the claw intended to feed the fabric is generally driven by a combined movement in two orthogonal directions, which give it an elliptical trajectory. To this end, this claw is fixed to a stirrup-shaped part, the free ends of whose two arms are pivotably linked to two parallel levers for controlling the displacement in one of these directions. Aligning the linking axes of the two arms of the stirrup is a complex manufacturing problem, since drilling bores in the two arms must be done in a single operation. Moreover, if this stirrup-shaped part is molded in one piece, like an injection molded cast iron part, the act of drilling releases tensions that make it even more difficult to align the bores.

The object of the present invention is to overcome the aforementioned disadvantages, at least in part.

To this end, the subject of the present invention is a device for pivotable linkage between two levers as defined by claim 1.

By its design, such a device makes it possible to use cast parts directly, in particular injection molded cast iron, without any prior machining whatever, thereby substantially lowering the production cost. It is understood that these parts may also be made of molded or injection molded plastic.

Further advantages will become apparent from the ensuing description and the accompanying drawing, which schematically shows an exemplary embodiment of the pivotable linkage device according to the invention.

Figure 1:
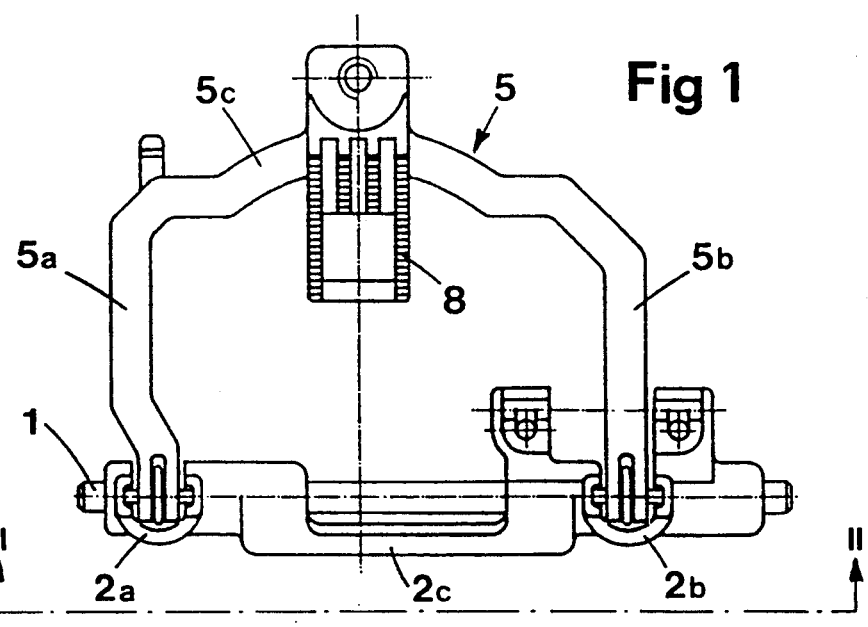
FIG. 1 is a plan view of a drive mechanism for feeding fabric, for a sewing machine provided with this pivotable linkage device.

The mechanism, shown by way of example, that is provided with the device for pivotable linkage between two levers that is the subject of the invention is in this case a drive mechanism for feeding fabric, in a sewing machine. Given that this mechanism is not itself part of the present invention, but serves only to show one example of its application, it will not be described in full, as long as such description is not necessary to understand the invention.

FIGS. 1–4 show a rod 1 intended to connect the mechanism to a frame (not shown), and on which a lever 2 is mounted pivotably. This lever includes two arms 2a, 2b which are solid with a linking element 2c provided with a longitudinal recess 3 open laterally to receive the rod 1. The free ends of each of the arms 2a and 2b are pivotably linked to the free ends of the two arms 5a, 5b of a stirrup-shaped part 5, the middle arm 5c of which carries a claw 8 intended to drive the fabric to be sewn in a predetermined direction, by successive increments.

Figure 2:
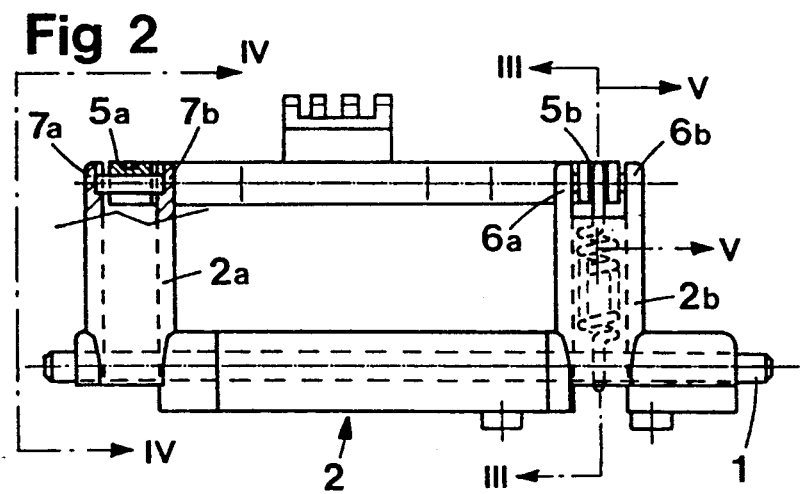
FIG. 2 is a front view, taken along the line II—II of FIG. 1.
Figure 4:
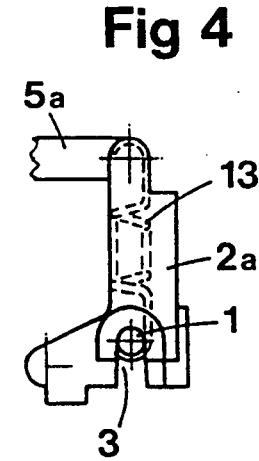
FIG. 4 is a front view, taken along the line IV—IV of FIG. 2.
Figure 3:
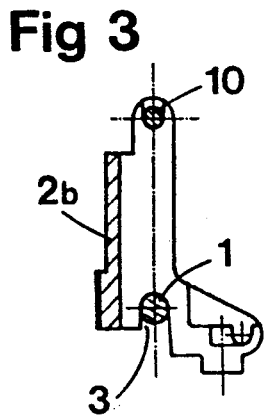
FIG. 3 is a sectional view, taken along the line III—III of FIG. 2.
Figure 5:
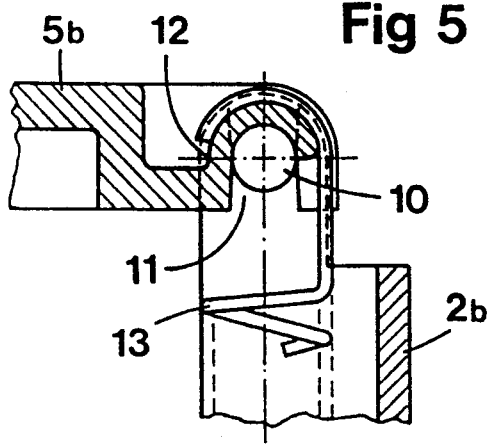
FIG. 5 is a fragmentary sectional view, on a larger scale, taken along the line V—V of FIG. 2.
Figure 6:
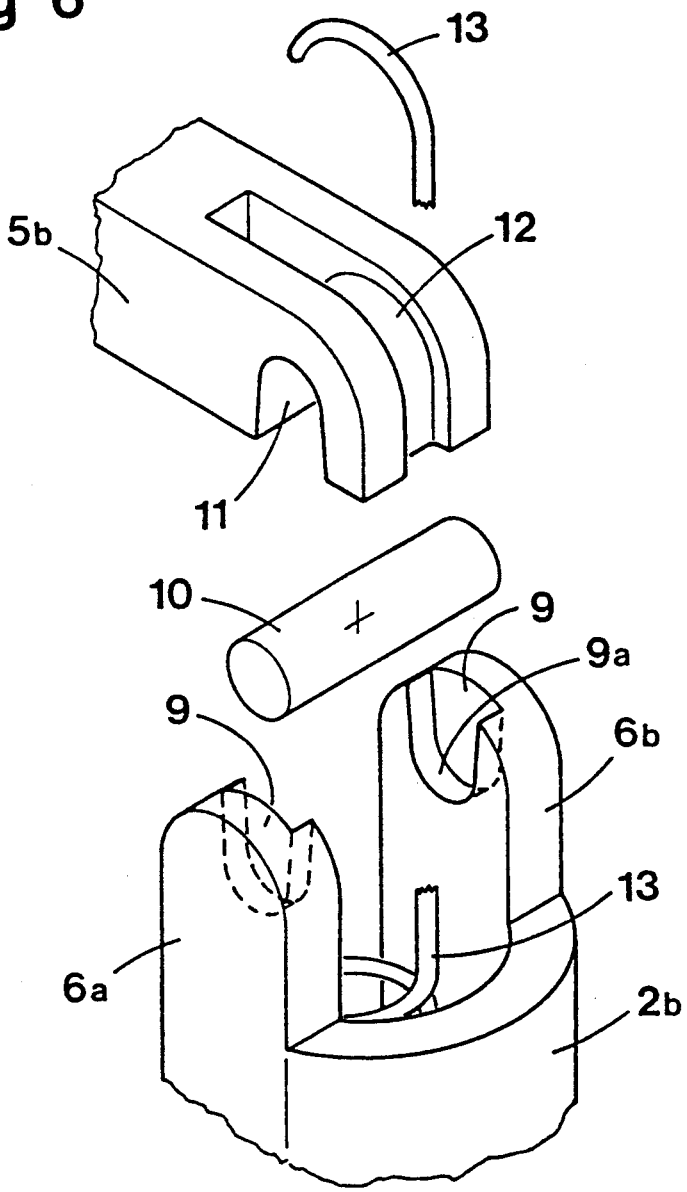
FIG. 6 is an exploded perspective view of FIG. 5.

The pivotable linkage that is the subject of the present invention is shown on a larger scale in FIGS. 5 and 6. FIG. 2 shows that the ends of the arms 2a and 2b pivotably linked to the stirrup-shaped part 5 end in forks, the tines of which are marked 7a, 7b and 6a, 6b, respectively, which between them receive the arms 5a and 5b, respectively, of the stirrup 5. As shown in FIGS. 5 and 6, each tine 6a, 6b, 7a, 7b, of which only the tines 6a, 6b are shown in FIG. 6, has a recess 9 made on its inner face. This recess 9 is parallel to this inner face of the tine 6a, 6b and extends longitudinally of this tine, thus ending at its end, making a passage for receiving a pivot 10. As shown in FIG. 6, preferably, this open space does not pass through the entire thickness of the tines 6a, 6b, so as to reserve some axial stop faces to retain the pivot 10. The bottom of the side face 9a of each recess 9 serves as a pivoting surface for the pivot 10.

The end of the arm 5b of the stirrup-shaped part 5 inserted between the tines 6a, 6b of the fork has a lateral recess 11, intended to engage the pivot 10. The part of the end of the arm 5b opposite the side face into which the lateral recess 11 opens has a semicircular groove 12 that is concentric with the axis of the pivot 10. This groove 12 serves to catch or retain one of the ends of a helical draw spring 13. To enable accommodation of this helical spring 13, the arms 2a and 2b of the lever 2 have a semi-annular cross section, as can be seen in FIG. 6 in particular, thus making a laterally open channel for the passage of the helical spring 13, the other end of which is caught on the rod 1 that passes into the longitudinal recess 3 of the linking element 2c that is solid with the levers 2a and 2b.

As can be seen, all the pivoting surfaces are formed by semicircular faces which are laterally accessible to the pivots. Similarly, the cross section of the levers 2a and 2b is semiannular, such that these levers can be made directly by molding, in particular of injection molded cast iron, without requiring any later machining whatever. This pivotable linkage device thus simplifies and considerably reduces manufacturing operations, while making it possible to obtain greater precision than what could be achieved with a traditional pivotable linkage. Furthermore, because of the fact that the levers are pressed elastically against the pivot, any play resulting from wear is automatically compensated for, so that the pivotable linkage will function noiselessly and with precision despite the wear.

We claim:

1. A device for pivotable linkage between two levers (2a, 5a; 2b, 5b), in which one end of a first lever (2a, 2b) has a fork that between its tines (6a, 6b; 7a, 7b) receives one end of a second lever (5b), characterized in that a recess (9) is made on each of said tines (6a, 6b) in the longitudinal direction of this tine, thus opening out at its end to form a passage for lateral introduction of the end of a pivot (10) between said tines, the bottom of the side face (9a) of each recess (9) forming a bearing surface for one of the ends of said pivot (1); the adjacent end of the second lever (5a, 5b) has a recess (11) opening laterally on one of its faces for engagement with the portion of the pivot (10) extending between the tines (6a, 6b; 7a, 7b) of the fork; and elastic means (13) exerting an oriented lateral pressure upon the end of this second lever (5a, 5b) to keep the pivot (10) and said bearing surfaces, on the one hand, and the bottom of the recess (11) of the second lever (5a, 5b) and the pivot (10), on the other, constantly in contact with one other.

2. The pivotable linkage device of claim 1, characterized in that the recesses (9) formed at the ends of the tines (6a, 6b) of said fork are made on the inner face of each of these tines, parallel to this face, to make axial stop faces for said pivot (10).

3. The pivotable linkage device of claim 1, characterized in that the end of the second lever (5a, 5b) has means (12) serving to retain the end of a helical draw spring (13).

4. The pivotable linkage device of claim 3, characterized in that the portion of the end of the second lever (5a, 5b) opposite the side face into which said recess (11) opens has, in its middle portion, a groove (12) that is concentric with the axis of said pivot (10) and serves to retain the end of said helical draw spring (13).

5. The pivotable linkage device of claim 3, characterized in that the second end of said draw spring (13) is caught around a second pivot (1), parallel to the first and laterally engaging a recess (3) the bottom of which forms the bearing surface of this second pivot (1), made at the other end of said first lever (2a, 2b).

6. The pivotable linkage device as in any one of the preceding claims, characterized in that each of said levers is molded in one piece with its bearing surfaces.

* * * * *